(12) United States Patent
Langgartner

(10) Patent No.: US 6,798,750 B1
(45) Date of Patent: Sep. 28, 2004

(54) PRIORITY ADMINISTRATION METHOD

(75) Inventor: Bernhard Langgartner, Landshut (DE)

(73) Assignee: Siemens Aktiengesellschaft, Munich (DE)

( * ) Notice: Subject to any disclaimer, the term of this patent is extended or adjusted under 35 U.S.C. 154(b) by 699 days.

(21) Appl. No.: 09/607,867

(22) Filed: Jun. 30, 2000

(30) Foreign Application Priority Data

Jun. 30, 1999 (DE) .......................................... 199 30 119

(51) Int. Cl.[7] .......................... H04L 12/26; H04J 1/16; G06F 11/00; G01R 31/08
(52) U.S. Cl. ...................... 370/252; 370/228; 370/352; 709/103; 710/116; 710/123
(58) Field of Search ................................ 370/352, 230, 370/235, 217, 228; 709/201, 203, 229, 236, 246, 247; 710/241, 244, 116, 264, 40, 56, 117, 121, 111

(56) References Cited

U.S. PATENT DOCUMENTS

| | | | | |
|---|---|---|---|---|
| 4,953,081 A | * | 8/1990 | Feal et al. .................. | 710/111 |
| 5,068,782 A | * | 11/1991 | Scheuneman et al. ...... | 711/151 |
| 5,241,632 A | * | 8/1993 | O'Connell et al. ......... | 710/117 |
| 5,257,385 A | * | 10/1993 | Roskowski et al. ......... | 710/265 |
| 5,303,382 A | * | 4/1994 | Buch et al. ................. | 710/244 |
| 5,307,466 A | * | 4/1994 | Chang ........................ | 710/121 |
| 5,572,686 A | * | 11/1996 | Nunziata et al. ............ | 710/116 |
| 5,805,840 A | * | 9/1998 | Dutton ....................... | 710/116 |
| 5,845,116 A | * | 12/1998 | Saito et al. ................. | 709/103 |
| 5,848,297 A | * | 12/1998 | Krein et al. ................. | 710/56 |
| 5,862,355 A | * | 1/1999 | Logsdon ..................... | 710/116 |
| 6,055,564 A | * | 4/2000 | Phaal ......................... | 709/207 |

* cited by examiner

Primary Examiner—Man Phan
(74) Attorney, Agent, or Firm—Morrison & Foerster LLP

(57) ABSTRACT

In a method for administration of priorities of routes in a telecommunications network, for converting priority values of various routes from an actual condition into a target condition, a request for defining its priority value is implemented for each route defined in the target condition that has one of the priority modes "EQUAL" or "INSERT" as a parameter. The requests are executed in the sequence of decreasing priority, and the priority mode "insert" is employed for the respectively first request for fixing on a given priority value. The priority mode "EQUAL" is selected for every further request for fixing on the same priority value.

5 Claims, 2 Drawing Sheets

PRIORITY ADMINISTRATION METHOD

BACKGROUND OF THE INVENTION

The invention is directed to a method for administering the priorities of routes in a telecommunications network. In a telecommunications network, for example according to the ITU-T Standard Q.751. 1 or Bellcore Standard GR-606-CORE, it is possible to define a set (signalling route set) of signalling paths or routes (signalling routes) between two signalling points A, B. All of these comprise different routes via which information can be transported or—for example, based on the prescription of a network operator—are allowed to be transported from point A to point B. When a message must be transported from A to B, the telecommunications network selects a route from this set. A priority that can assume the values 1, 2, 3 . . . is thereby allocated to each route. The route with the highest priority, i.e. with the numerically lowest priority value, is selected for the transport of the message.

The allocation of priorities to the various routes of the set serves, first, for assuring an effective transmission in that short or high-performance routes have a higher priority assigned to them than longer routes or routes with lower performance. Another aspect that can play a part in the allocation of priorities are the transit costs through outside networks. When a vendor of telecommunications services cannot completely set up a requested connection within his own network, then he will preferably conduct messages via those routes that incur the lowest transit costs. These costs can change on short notice due to the competition of the vendors with one another. In such a case, there is an urgent need to be able to quickly and efficiently modify the priorities of the individual routes of the set.

For this purpose, the aforementioned ITU-T standard defines requests with which routes can be generated, configured or deleted. These requests are referred to below as "CREATE", "SET" or "DELETE". It is self-evident that requests having the same effects can also be implemented in telecommunications systems that do not correspond to this ITU-T standard.

These requests have a number of attributes, including the identity of the route, the priority value and the priority mode. The identity of the route is an ordering number that is defined when a route is generated by "CREATE" and that is employed by the requests "SET" and "DELETE" in order to reference a route to be manipulated.

There are four different priority modes, namely "EQUAL", "INSERT", "EXCHANGE_SINGLE" and "EXCHANGE_GROUP". These priority modes define the effects that the addition (by CREATE) or reconfiguration (by SET) of a route has on a route set. When the priority mode is "EQUAL", then the new route is added to those already existing with the same priority of the route set. Given employment of the priority mode "INSERT", the newly created or reconfigured route displaces already existing routes with the same or a higher priority value onto a lower priority, i.e. the priority value of the "displaced" is incremented. When the priority is modified with the EXCHANGE priority mode onto a target value that is established at a plurality of routes of the route set, then all of these receive the previous priority value of the route reconfigured by the request. In the case of the "EXCHANGE_SINGLE" priority mode, only the priority of the route specified in the request is modified to the target value; in the case of "EXCHANGE_GROUP", the priorities of all routes that have the same initial priority value as the route specified in the request are modified to the target value thereof.

The handling of these requests is often extremely burdensome, particularly given extensive route sets, since it is not possible to recognize without further ado with what requests an actual condition of the priority values of the routes of the route set can be efficiently converted into a given target condition. An algorithm has not yet been found that allows the commands that allow the one to be converted into the other for a given actual condition and a given target condition, so that a manual reprogramming by an operator has previously been necessary for administering the priorities of the routes in every individual case.

SUMMARY OF THE INVENTION

It is therefore an object of the invention to specify a method for the administration of the priorities of these routes that can be fully automatically implemented and with which an arbitrary actual condition can be converted into an arbitrary target condition.

This object is achieved in that a request for defining its priority value is implemented for each route defined in the target condition that has one of the priority modes "EQUAL" or "INSERT"; that the requests are executed in the sequence of decreasing priority; and that the priority mode "EQUAL" is selected for one of these requests for fixing a given priority value when a request for fixing on the same priority value has already been previously implemented.

Preferably, the "INSERT" priority mode is employed for the respective first request for fixing on a given priority value.

The employment of the EXCHANGE priority mode can thus be completely foregone. The number of requests required for producing an arbitrary target condition is no greater than the number of routes in the route set.

Further features and advantages of the invention derive from the following description of exemplary embodiments with reference to the Figures.

DESCRIPTION OF THE PREFERRED EMBODIMENTS

Figure 1:
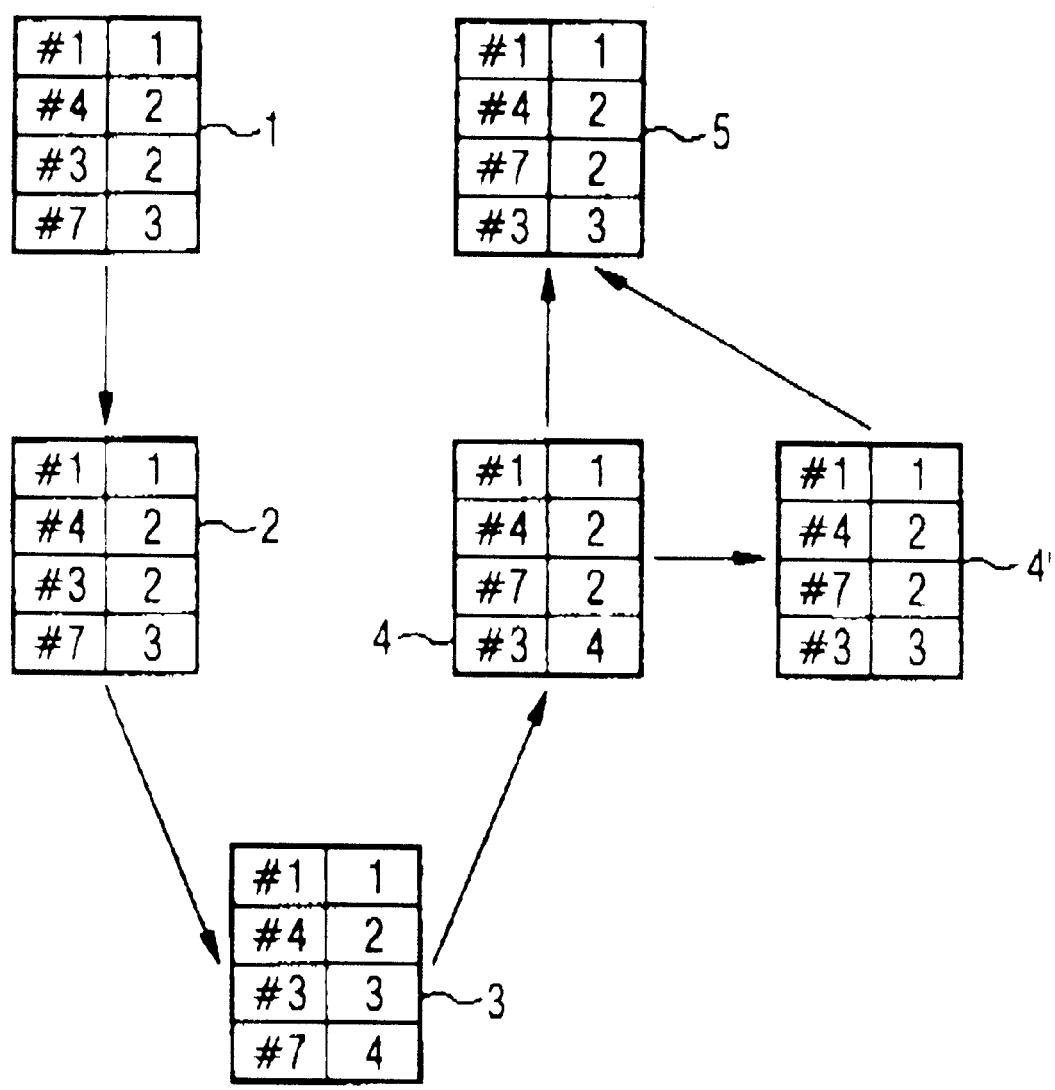
FIG. 1 shows an example for the application of the inventive administration method given a mere change of priority values in a route set.

In a number of diagrams 1 through 5, FIG. 1 illustrates the step-by-step execution of the inventive method with reference to the example of a small route set that comprises four routes for the message transmission between two signalling points of a telecommunications network. Each of the diagrams 1 through 5 has four rows that respectively correspond to one of the four routes and two columns, whereby the identity of a route is indicated in the left-hand column and its priority value is indicated in the right-hand column. The route having the identity n is referred to as route #n below for the sake of simplicity.

The diagram 1 shows the actual condition of the priorities of the various routes of the route set. The route #1 has the highest priority "1" and is therefore employed with priority for the transmission of messages. The routes #4 and #3 have the next-ranking priority "2" and are consequently only employed when route #1 is not available. The way in which a plurality of routes having the same priority are employed can be different for different telecommunications systems. For example, thus, the route appearing at the uppermost location in the diagram can be employed with priority and the following ones are only employed when the one standing at the first location is blocked (which would again effectively amount to a priority graduation), or the transmission load can be uniformly distributed onto the various routes (load sharing). When load sharing is implemented, then all routes of the same priority are not necessarily involved therein; in order, for example, to simplify the administration of load sharing, it can be limited to the two routes cited at the first position in the diagram, and potentially existing, further routes with the same priority are only utilized when one of the former is down. As can be seen, the sequence in which the routes with the same priority appear in the diagram is of significance for their employment in the message communication. In order to also be able to unambiguously determine the sequence of the routes in the diagram when a given priority value occurs repeatedly, an unambiguous value that reflects this sequence must be stored in the telecommunications system for each route. The telecommunications system needs this information in order to administer the distribution of the transmission load onto routes of equal priority.

Diagram 5 shows the target condition of the priority values of the various routes. It differs from diagram 1 representing the initial condition only in terms of the last two rows, wherein the sequence and the priorities of the routes #3 and #7 are transposed.

Although such a transposition could be produced with the assistance of a set request with the priority mode "EXCHANGE_SINGLE", ITU-T Q751.1 does not define whether the result of such a request would be the diagram 5 or a diagram wherein the route #7 would rank before the route #4 in the sequence of routes having the same priority.

In contrast, the method of the invention supplies an unambiguous result in this case.

As a first step of the method, a SET request is implemented for the route #1, this standing at the first position in diagram 1. The request specifies the priority value "1" and the priority mode "INSERT". Due to the priority mode "INSERT", it is assured that the route #1 comes to stand at the first position in the new diagram 2, regardless of the priority values of all other routes. Had there been other routes with the priority value "1" in diagram 1, then these would have been displaced onto lower priority levels in diagram 2 as a result of the priority mode "INSERT". The priority values of the following routes are respectively raised by 1 in exactly the same way due to the employment of the "INSERT" mode. The priority values "3", "3" and "4" are thus initially obtained for the routes #4, #3 and #7. There is no route with the priority value "2". ITU-T Q751.1 provides two different postures of telecommunications systems in such a situation; such "priority gaps" can be allowed or interdicted. When they are interdicted, the telecommunications system automatically undertakes a correction of the diagram in that is reduces the priority values of all routes on the other side of the gap by 1. The result is diagram 2. Since the priority value of the route #1 is not changed in the example under consideration here and no further route has the priority value "1", diagrams 1 and 2 are identical.

The case wherein priority gaps are allowed is not discussed in detail here since the administration method for both cases uses the same requests and leads to the same result.

Subsequently, a SET request is implemented for the route #4. The target priority value is "2", and, since it is a matter of the first route here that is set to this priority value during the course of processing of the method, the priority mode "INSERT" is employed. The result thereof is that the route #3, which likewise has the priority value "2", and the route #7 together with it are displaced onto lower priorities having the values 3 or, respectively, 4 (see diagram 3).

The route #7 is set to the priority value "2" due to a third SET request; since this is a matter of the second request with which a route is set to this value, the priority mode "EQUAL" is employed. As a result thereof, the route #7 is given the second position among the routes with the priority value "2", following route #4. In general, the sequence in which routes having the same priority are processed is based on their sequence in the diagram of the target condition, just like the sequence of routes with different priority.

Diagram 4 shows the immediate result of this request. Here, the route #3 has the priority "4"; there are no routes with the next-higher priority "3". When such a priority gap is allowed, the next and last method step is directly applied to the condition represented by diagram 4; otherwise, the telecommunications system automatically corrects the priority of the route #3 to the value "3", as shown in diagram 4'. This difference, however, is not decisive for the result of the method. In any case, the method provides a last step wherein the priority of route #3 is explicitly fixed with a set request, to the value "3" here. Since this is a matter of the first request with which a priority value "3" is defined, the priority mode "INSERT" is again employed here.

Figure 2:
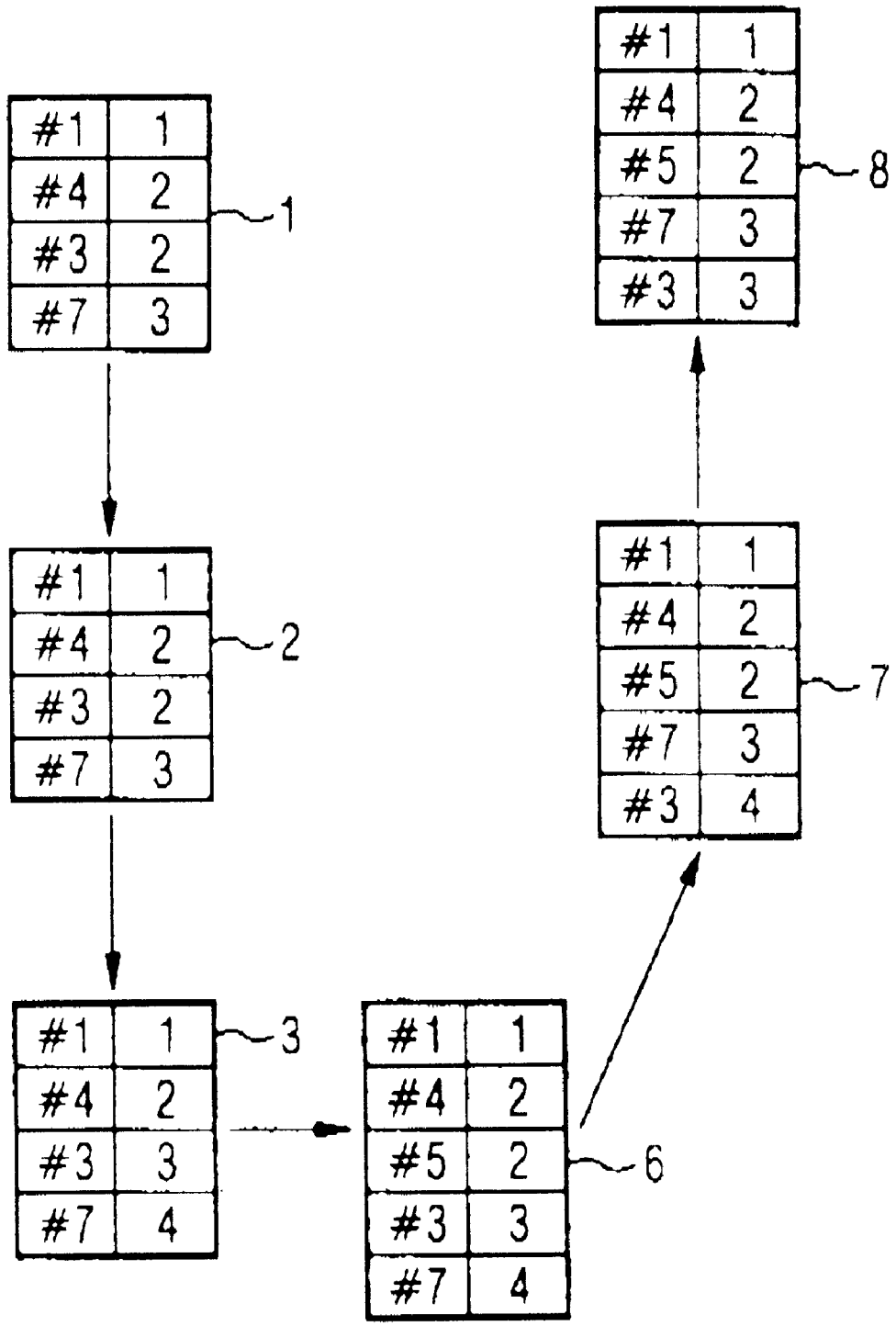
FIG. 2 shows an example for the application of the method given the addition of a route.

FIG. 2 shows a second exemplary embodiment of the method of the invention wherein an additional route is defined in the framework of the priority administration, and the sequence of one or more routes is modified at the same time. The initial condition is the same as in the case of FIG. 1 and is shown with the same diagram 1; the target condition is represented by diagram 8, into whose third row the additional route #5 has been inserted. The target priority values of the first two routes 1 and 4 of the diagram are the same as in the case of the example from f1 1; consequently, the first two method steps are also the same and yield the same diagrams 2 and 3. As a third step, the route #5 ranking third in the target diagram must be inserted. A CREATE request is employed for this purpose; the target priority value is "2" and, since a SET request with this priority value was already previously carried out for the transition from diagram 2 to 3, the priority mode must be "EQUAL". The priority condition represented by the five-row diagram 6 is thus obtained. The target condition is reached by two further SET requests, for the route #7 with the priority value 3 and priority mode "INSERT", and for the route #3 with priority value "3" and priority mode "EQUAL".

Any desired computer is suited for the implementation of the method that is programmed to allow a user to edit a target condition diagram such as, for instance, 5 or 8 and that, via an interface, is in the position to send SET, CREATE or—for deleting routes—DELETE requests with suitable parameters to the telecommunications system. For selecting the respectively suitable request from these three types of requests, it suffices when the computer "knows" which routes are defined in the actual condition of the telecommunications network. Knowledge of their priorities is not required. A DELETE request can be automatically generated for routes defined in the actual condition and not contained in the diagram of the target condition; routes that are not present in the actual condition but are present in the diagram of the target condition are generated with "CREATE"; all other routes are configured with "SET". The computer can obtain the knowledge of the defined routes from a query of the telecommunications network or can take it from a diagram produced earlier for priority administration and stored on the computer.

Although various minor modifications might be suggested by those skilled in the art, it should be understood that my wish to embody within the scope of the patent warranted hereon all such modifications as reasonably and properly come with the scope of my contribution to the art.

I claim as my invention:

1. A method for administration of priorities of routes in a telecommunications network, comprising:

determining a target condition of priority values of various routes and converting an actual condition of the priority values into the target condition with assistance of requests or equivalent requests;

implementing a request for defining its priority value for each route defined in the target condition that has one of priority modes "EQUAL" or "INSERT";

executing the requests in a sequence of decreasing priority; and selecting the priority mode "EQUAL" for one of the requests for fixing a given priority value when a request for fixing on the same priority value has already been previously implemented.

2. The method according to claim 1 wherein the priority mode "INSERT" is employed for a respective first request for fixing on a given priority value.

3. The method according to claim 1 wherein a create request is implemented for a route when its priority is defined in the target condition but not in the actual condition.

4. The method according to claim 1 wherein a set request is implemented for a route when its priority is defined in the target condition and in the actual condition.

5. The method according to claim 1 wherein a delete request is implemented for a route when its priority is defined in the actual condition but not in the target condition.

* * * * *